(No Model.) 6 Sheets—Sheet 1.
A. H. SMITH.
STREET SWEEPER.

No. 581,312. Patented Apr. 27, 1897.

WITNESSES:
L. N. Legendre
R. L. Spehner

INVENTOR
Andrew H Smith
BY
Fw Barker
ATTORNEY (No Model.)  6 Sheets—Sheet 2.

A. H. SMITH.
STREET SWEEPER.

No. 581,312.  Patented Apr. 27, 1897.

WITNESSES:
L. N. Legendre
R. L. Spehner

INVENTOR
Andrew H. Smith
BY Fw Barker
ATTORNEY (No Model.)

A. H. SMITH.
STREET SWEEPER.

No. 581,312. Patented Apr. 27, 1897.

WITNESSES:
L. N. Legendre
R. L. Spitzner

INVENTOR
Andrew H. Smith
BY F. W. Barker
ATTORNEY (No Model.)  6 Sheets—Sheet 4.
A. H. SMITH.
STREET SWEEPER.
No. 581,312.  Patented Apr. 27, 1897.
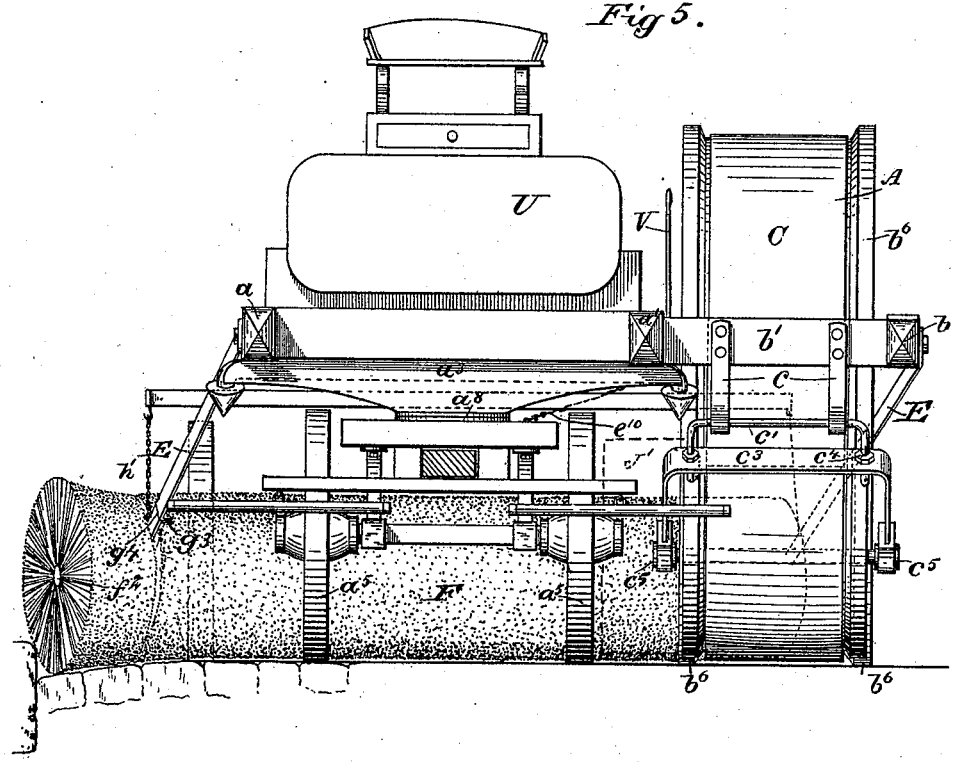
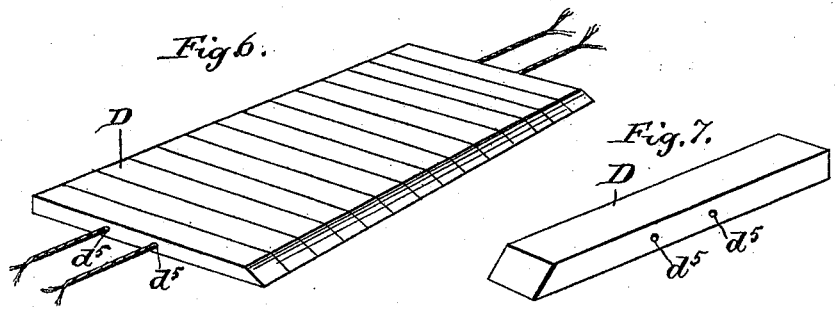
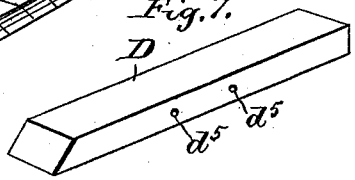
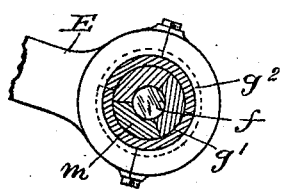
WITNESSES:
L. N. Legendre
R. L. Spehner
INVENTOR
Andrew H. Smith
BY Fw Parker
ATTORNEY (No Model.)

A. H. SMITH.
STREET SWEEPER.

No. 581,312.

6 Sheets—Sheet 5.

Patented Apr. 27, 1897.

WITNESSES:
John Peters
Joseph Miskolcz

INVENTOR
Andrew H. Smith
BY
F. W. Barker
ATTORNEY (No Model.)  6 Sheets—Sheet 6.
A. H. SMITH.
STREET SWEEPER.
No. 581,312. Patented Apr. 27, 1897.
Fig. 10.
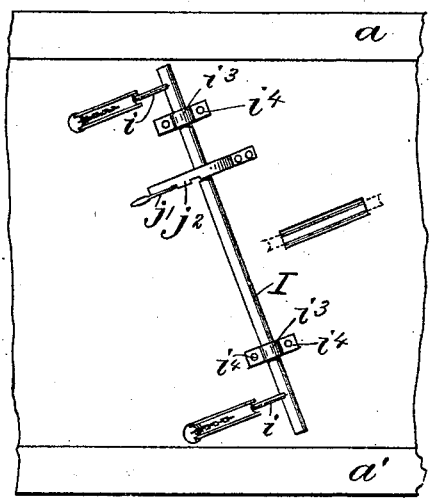
Fig. 11.
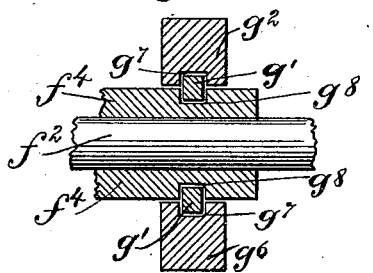
Fig. 12.
WITNESSES:
L. N. Legendre
J. V. Flynn
INVENTOR
Andrew H. Smith
BY
F. W. Barker
ATTORNEYS.

UNITED STATES PATENT OFFICE.

ANDREW H. SMITH, OF NEW YORK, N. Y.

STREET-SWEEPER.

SPECIFICATION forming part of Letters Patent No. 581,312, dated April 27, 1897.

Application filed March 13, 1895. Serial No. 541,535. (No model.)

*To all whom it may concern:*

Be it known that I, ANDREW H. SMITH, a citizen of the United States, residing at New York, in the county and State of New York, have invented certain new and useful Improvements in Street-Sweeping Machines, of which the following is a full, clear, and exact specification.

The objects of my invention are, first, to construct a street-sweeper which shall collect and carry all dirt and refuse which it sweeps until the said refuse may be deposited entire at a designated place; second, to provide suitable adjustable mechanism for accomplishing such end; third, to combine a water-tank and sprinkler with said sweeper, and, fourth, to provide a means whereby the whole may be set in operation at one time and be under the management of the operator.

With these objects in view reference is had to the annexed drawings, in which—

Figure 1:
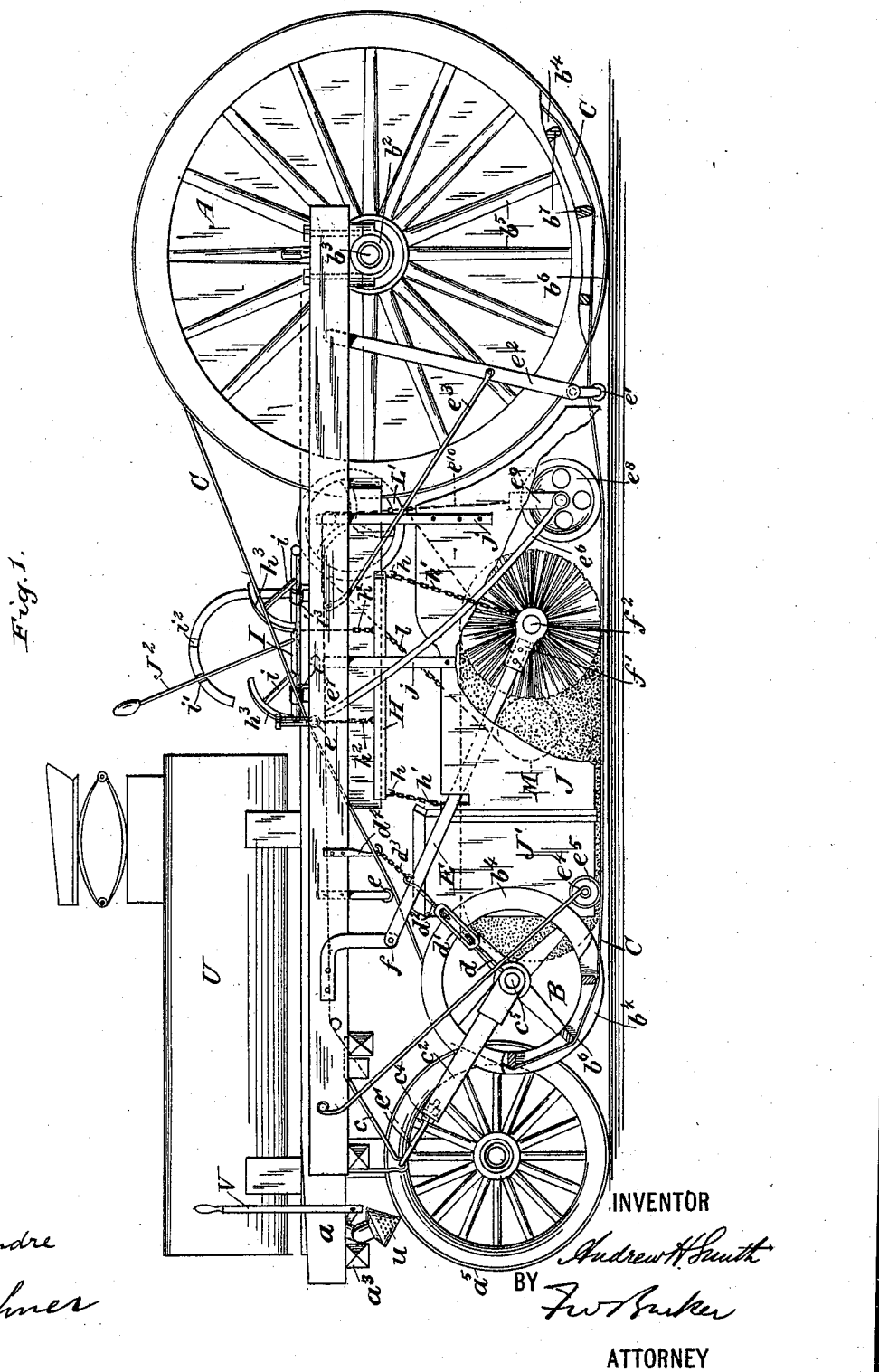
Figure 2:
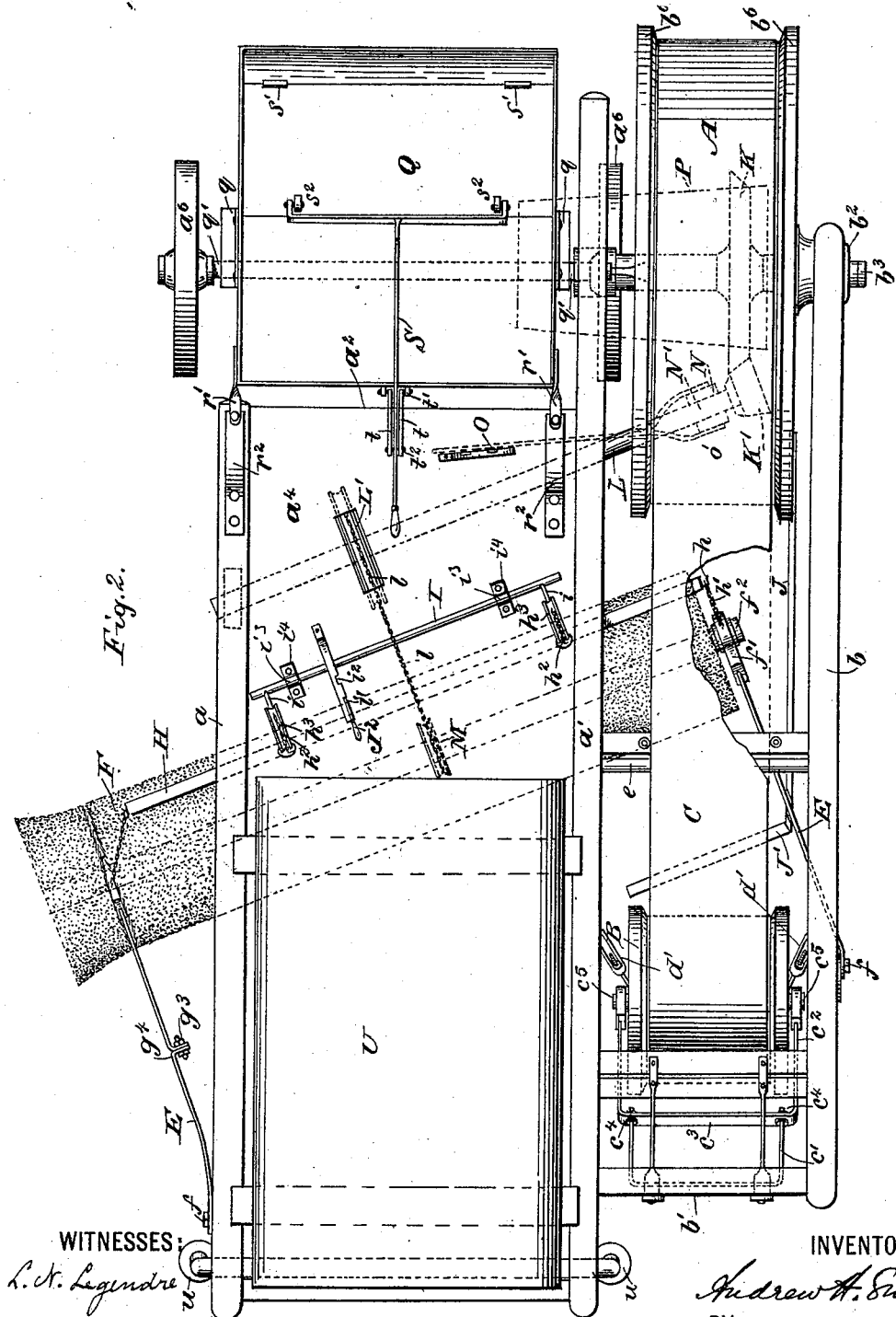
Figure 3:
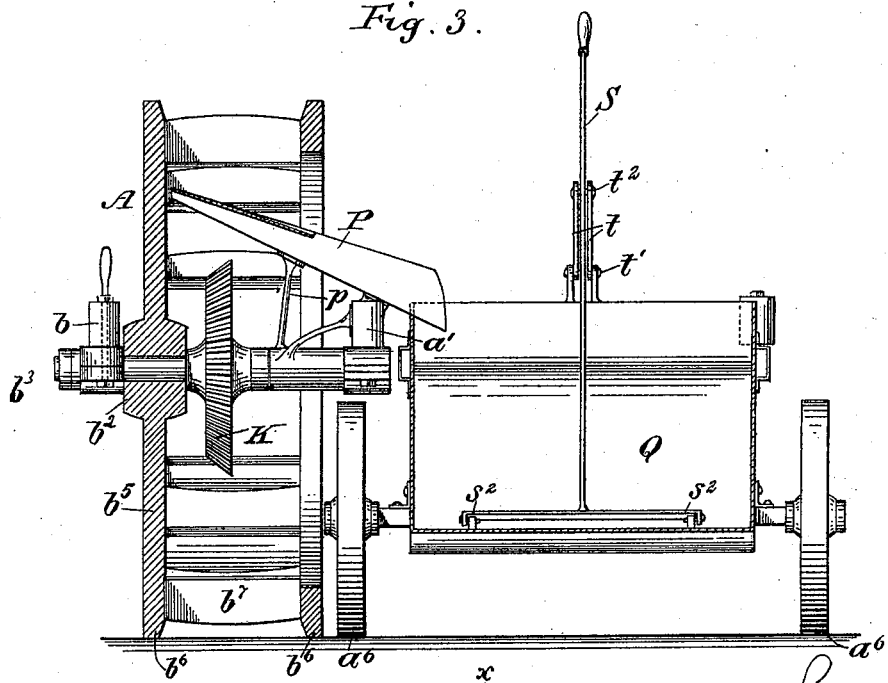
Figure 4:
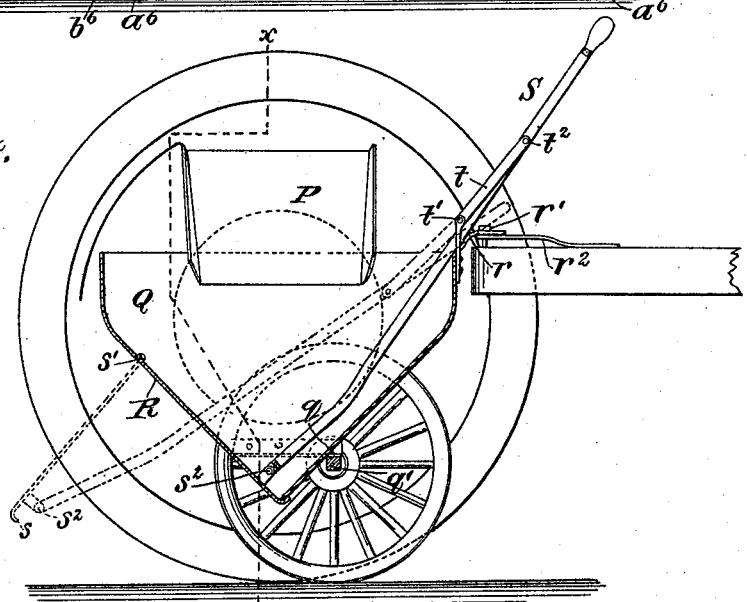
Figure 9:
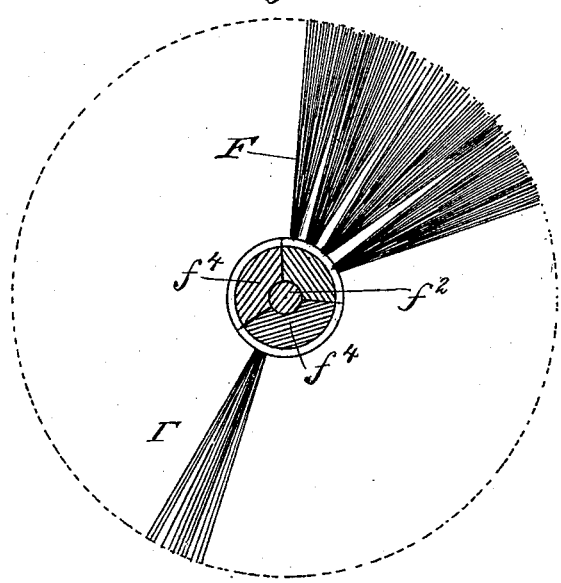

Figure 1 is a side elevation of the complete machine, partly broken away. Fig. 2 is a plan view of Fig. 1, also partly broken away. Fig. 3 is a rear elevational view of Fig. 1, showing the main belt-wheel and the refuse-receiver in section. Fig. 4 is a sectional side elevation of the refuse-receiver and its opening and closing device. Fig. 5 represents a front elevation of the complete machine. Fig. 6 is a perspective view of a portion of a slat belt, representing a modification of the belt shown in Fig. 1. Fig. 7 is an enlarged perspective view of one of the slats of said slat belt. Fig. 8 is a sectional view of a bearing and collar for the machine-brush. Fig. 9 is a cross-sectional view of the sweeper-brush. Fig. 10 is a detail plan view showing the bearings for the bar I. Fig. 11 is a detail view of the clutch mechanism for connecting the brush with the driving mechanism. Fig. 12 is a cross-section of Fig. 8.

Similar letters referring to similar parts throughout the specification, $a$, $a'$, $a^2$, and $a^3$ represent the body-framework of the machine, the said frame being covered with a floor $a^4$. The part $b\ b'$, with its cross-pieces and braces, represents the frame for the belt and belt-wheels of the machine, which frame is extended laterally beyond the body-frame.

The body-frame of the machine is supported on the wheel A and on the ordinary wheels, such as are shown at $a^5$, the wheels $a^5$ being on a swiveled axle $a^7$, which axle is turnable on the usual fifth-wheel $a^8$.

To the frame $b\ b'$ is pivoted, by means of the bearings $b^2$ and a shaft $b^3$, a large belt-wheel A, the flanged edges of whose periphery are adapted to roll upon the ground, as shown at the broken portion $b^4$. This wheel A is constructed, preferably, of a set of radial spokes $b^5$ and two fellies $b^6$, the said fellies being spaced a given distance apart around the same center and being connected by means of cross-bars $b^7$, as set forth in Fig. 1. These cross-bars, as shown, are all located in said fellies a short distance back from the periphery of the wheel A.

A belt guide-wheel B, preferably of much smaller diameter, but similar in all respects of construction, except it may be in the number of spokes, is hung and pivoted to the forward portion of the frame $b\ b'$ on a direct line with the wheel A by means of a bracket or its equivalent $c$, a yoke or link $c'$, hung thereon, a second yoke or link $c^2$, connected with said yoke $c'$ by means of holes being formed in the cross portion thereof $c^3$, (the bars of the yoke $c'$ having threaded ends and adjustable nuts $c^4\ c^4$ placed on said bars before and after the said cross-piece $c^3$ of the yoke $c^2$ to adjust and bind the latter,) and an axle $c^5$ of the said wheel B, pivoted in the end of the parallel portions of the said yoke $c^2$. A threaded bar $d$ is arranged on each side of said wheel and has connection at one end with the yoke $c^2$, connecting at its other end with a turnbuckle $d'$, whose other end is connected with another threaded rod $d^2$, having a hook to which is attached a chain $d^3$, which is adapted to catch adjustably upon a hook $d^4$, secured to the frame $b\ b'$, and provides a means for raising, lowering, and adjusting the elevation of the said wheel B.

Between the fellies $b^6$ and around the bars $b^7$ of both wheels A and B is placed an endless belt C, of rubber, as shown in Fig. 1, or of wooden slats D, as shown in the modified form of construction set forth in Figs. 6 and 7. These slats are preferably rectangular in cross-section and are bored laterally with a number of holes $d^5$, through which are passed endless ropes to hold the said slats D together in belt form. This construction provides a wooden-slat belt which is flexible, provides its own buckets, and will wear for a long period. The ends of the said slats D are also preferably formed sharp-angularly to the straight longitudinal line of the flat under surfaces of each slat.

The rubber-fabric belt C, which is preferred as being the simplest of the two constructions, is guided along its upper portion by means of an upper and an under roller $e\,e$ and along its lower or ground portion by means of an under roller $e'$, which roller is secured to a downwardly-hanging rod $e^2$, which is secured to the frame $b\,b'$ and is connected to a brace-rod $e^3$, which is also securely fastened to the said frame. It will be seen that the said roller $e'$ passes under the belt C for the purpose of keeping the said belt off of the ground at that point. It is also to be noticed that the belt C does not touch the ground at either the wheel A or B and that the flanges of the wheel B are free from the ground, while the flanges of the wheel A roll upon the ground.

Connected pivotally to the frame $b\,b'$ by a yoke or link $e^4$ is a heavy roller $e^5$, which is adapted to roll upon the upper surface of said belt to hold the latter down against the ground as it moves away from the wheel B.

A backwardly-inclined bar $e^6$ is pivoted at $e^7$ to the frame $b\,b'$ and pivotally engages a heavy wheel $e^8$, which is located directly over and is adapted to roll upon the inner edges of the belt C as the latter moves backwardly by the movement imparted to it by the revolution of the wheels. Connected with a yoke $e^9$, which is movably connected with the shaft of the said wheel $e^8$, is a chain $e^{10}$, which, running upwardly over a plain roller secured to the frame $b\,b'$, forwardly along said frame, and over another plain roller in the said forward portion of said frame, is connected with the portion of the fifth-wheel $a^8$ which is attached to the truck to which are pivoted the front wheels $a^5$. The belt, when the machine is set in operation, is drawn taut by the method described. The wheel $e^8$ holds the inner edge of the said belt down close against the ground, so that the brush of the machine will brush the sweepings upon it, but when turning in a right-hand direction (relative to the construction shown) the aforesaid fifth-wheel $a^8$ will, when thus turned, by pulling upon the aforesaid chain $e^{10}$ raise the wheel $e^8$ from the edge of the said belt, which will thus, by means of its tension, rise from the ground, and allow the machine to freely turn, without injuring said belt.

Hung to each side of the machine-frame at $f$ is a backwardly-trailing rod or link E, which at its other end supports a bearing-piece $f'$, consisting of a metal plate having a socket to receive said rod E, and into which bearing fits pivotally a shaft $f^2$, which extends diagonally underneath the machine-frame from one side to the other side thereof. (See Fig. 2.) Around the said rod $f^2$ is arranged a brush F of circular form, the said brush being preferably secured to a wooden core composed of longitudinal segments $f^4$, surrounding the shaft $f^2$. One end of the said brush is so placed that it overlaps the belt C, and the opposite end of the said brush is adapted to project considerably beyond the opposite side of the machine, and is formed larger in diameter at that end for the purpose of brushing gutters and similar depressions and for sweeping surfaces adjacent to walls, &c. For such purposes the opposite bearing $f'$ is placed inwardly a few inches, preferably, from the end of the brush, so that it will not interfere with sweeping in close corners, as described.

The bearing upon which the brush revolves may be supported from the bar E, as shown in Fig. 1, the said bearing being a metal plate with a socket to receive said bar E. As shown in Fig. 8, the bearing is formed in two pieces, $g^2$ and $g^6$, each of said pieces representing the half of a circle and having a groove $g^7$. Within said groove is loosely fitted a ring $g'$, the said ring also fitting in a groove $g^8$ in the segments $f^4$, which segments form the core which surrounds the shaft $f^2$. (See Figs. 8, 9, and 12.)

One of the bars or rods E is formed of two pieces, as shown, by a twist-joint at $g^4$, which joint is provided with a pin $g^3$ and is held together thereby. This arrangement is to allow an uneven vertical movement to the brush F without twisting or wrenching the bearings $f'$.

Suspended over the brush F, a little back of the latter, is a beam H, provided at each end with a hook $h$, to which is hung a chain $h'$, which connects with each bearing part $f'$ of the said brush. Running upwardly through the machine-flooring are two additional chains $h^2\,h^2$, which are attached to grooved segmental pieces $h^3\,h^3$, which in turn are supported each by a lever $i$, connected firmly with a bar I, which is supported in common bearings (not shown) intended to be secured to the machine frame or flooring. The bearing for said bar I, as shown in Fig. 10, consists of a metal plate $i^3$, shaped to conform to the shape of the bar I and secured to the floor $a^4$ by the bolts $i^4$ or in any other suitable manner. To this bar I is secured a hand-lever $J^2$, which is adapted, when in forward position and the brush F is thus lowered, to engage a recess $i'$, and when in backward position and the said brush is thus raised from the ground to engage a recess $i^2$.

A guard-board J is rigidly hung from the machine-frame, as shown at $j\,j$, its lower edge just clearing the belt C. A portion $J'$ of said board passes inward angularly from the board J under the machine. The purpose of this board is to arrest the dust and dirt which the brush throws in its direction.

Pivoted upon the shaft $b^3$ and secured to and revoluble with the wheel A is a bevel-gear K, meshing with which is a pinion $K'$, which is supported by and revolves a shaft L and thus a sprocket-wheel $L'$, secured thereto, around which latter runs a sprocket-chain $l$, which, by means of meshing with a sprocket-wheel M, placed on the shaft or core of the brush F at about the middle of the latter, drives the same when the machine is set in motion.

The shaft L is revolubly supported beneath the machine-body frame by means of hangers $L^2$, and said shaft has a pinion K', rigidly secured at one end and adapted to engage with the bevel gear-wheel K. Said pinion K' is arranged to be moved in and out of connection with the gear K in the following manner: A collar N is loosely fitted over the shaft L and has connected with it the forked ends $o'$ of a link $o^2$. Rigidly secured upon the shaft L at either side of the collar N are collars N' and $N^2$, the function of said collars being to enable the movement given the collar N to be communicated to the shaft L to operate the pinion K', moving it against or away from the gear K. The other ends of the link $o^2$, passing, preferably, under the frame of the machine, engage with the lower end of a hand-lever O, which is fulcrumed in a bearing on the said frame and passes upwardly through the floor thereof, the upper or hind part of the said lever O being adapted to engage in a notched arrester $o^3$. It is thus seen that when the lever O is moved in one direction the pinion K' will, by being thus moved, engage with the wheel K and that the brush F will be revolved by motion and force imparted by the said wheel K, and that when the lever is moved in the opposite direction the pinion K' will be thereby disengaged from the wheel K, and the brush, in consequence, will cease revolving.

Supported within the hollow of the wheel A by supports $p$, attached to the machine-frame, is a chute P, having upturned sides. The said chute is adapted to receive all of the collected matter brought up by buckets formed by the union of the belt C with the cross-bars $b^7$ and to direct the said collected matter to the receptacle Q, which is supported by means of being strapped, as shown at $q$, to an axle $q'$, sustained by a pair of wheels $a^6 a^6$, the said receptacle Q being connected movably by means of metal straps $r$ to vertical bolts $r'$, upward tension-springs $r^2$ having a bearing against the under side of said straps to take up the vibration and to allow for the difference in movement and jar of the two connected parts. A bottom R, provided with an overturned edge $s$, is hinged, as at $s'$, to said receptacle. A lever S, linked to the bottom R at $s^2$ and extending upwardly therefrom, is movably connected with the machine-frame by means of a double link $t$, pivoted at $t'$, and between which links $t$ the said lever is adapted to move, the said lever being connected to the other or upward ends $t^2$ of the said links. The normal position of the said lever, since it is past and below the center of the pin $t'$, on which the links $t$ turn, consequently holds the bottom R in closed locked position. The bottom being thrown open to deliver the sweepings from the receptacle, when the lever S is drawn backward and the links $t$ are turned to the other side of the center of their pivots $t'$ the device then assumes the position shown by the dotted lines of Fig. 4.

A tank U is supported upon the machine-frame and forms an important feature of this invention, in that the dirt and dust is sufficiently moistened to prevent it from blowing, and in such moist condition is immediately swept onto the belt C and is thereby conveyed to the receptacle Q and is not left to dry before the sweeper comes around to simply shift it from one locality to another, as is the usual method.

The sprinkler-tank U and the sprinklers $u$ $u$ may be of the usual construction, the latter being arranged at the extreme forward part of the machine and being susceptible of adjustment in different directions. V represents a lever adapted to connect with a valve for governing the flow of water to said sprinklers from the tank U.

Having now fully described my invention and the manner in which I accomplish the desired end, preferring though not limiting myself to the exact construction, but seeking to cover the new constructions and the principle set forth, what I therefore claim, and desire to secure by Letters Patent, is—

1. In a street-cleaning machine, a frame, a brush connected therewith, means for operating said brush, a belt-driving wheel and a guide-wheel, an endless belt placed adjacent to said brush and around said wheels, the said belt being stretched along the ground for a portion of its length and being normally free from the ground, means, consisting of a hanging roller for depressing said belt against the ground, and means, consisting of a suitable device, for raising said roller and thereby permitting the said belt to rise from the ground, substantially as set forth.

2. In a street-cleaning machine, a frame, a brush connected therewith, means for operating said brush, a belt-driving wheel and a guide-wheel, an endless belt placed adjacent to said brush and around said wheels, the said belt being stretched along the ground for a portion of its length and being normally free from the ground, means, consisting of a pivotally-hung roller, for depressing said belt against the ground, links connected with the machine-frame for pivotally holding said roller, and a suitable means connected with said links and roller for raising the latter, substantially as set forth.

3. In a street-cleaning machine, a frame, a brush connected therewith, means for operating said brush, a belt-driving wheel and a guide-wheel, an endless belt placed adjacent to said brush and around said wheels, the said belt being stretched along the ground, means, consisting of a hanging roller for depressing said belt against the ground, links connected with the machine-frame for pivotally holding said roller, and a suitable means connected with said roller for raising the latter and thereby permit the said belt to rise from the ground, the said roller having a bearing along the edge of the said belt adjacent to the said brush, substantially as set forth.

4. In a street-cleaning machine a frame having a belt-driving wheel and a guide-wheel, an endless belt arranged around said driving-wheel and said guide-wheel, the said guide-wheel being revolubly supported free from the ground, flanges formed on said wheel, and an adjustable device connected with said wheel for shifting the position thereof, to tighten said belt, the said adjustable device consisting of a yoke, pivotally supporting said wheel, a yoke having connection with said supporting-yoke, by means of holes formed in one of said yokes, threads formed on said yoke, and nuts adjusted to the ends of the other of the said yokes, the said second-mentioned yoke being hinged to a bracket connected with the machine-frame, substantially as set forth.

5. In a street-cleaning machine a frame having a belt-driving wheel and a guide-wheel, an endless belt arranged around said driving-wheel and said guide-wheel, the said guide-wheel being revolubly supported free from the ground, flanges formed on said wheel, and an adjustable device connected with said wheel for shifting the position thereof, to pull taut said belt, the said adjustable device consisting of a yoke pivotally supporting said wheel, a yoke having connection with said supporting-yoke, by means of holes formed in one of said yokes and threads formed on the latter, and nuts adjusted to the ends of the other of the said yokes, the said second-mentioned yoke being hinged to a bracket connected with the machine-frame, and a second adjustable device adapted to fix the elevation of the said guide-wheel and connected therewith, substantially as set forth.

6. In a street-cleaning machine a frame, a brush connected therewith, and a mechanism for operating same, a belt-driving wheel and a guide-wheel, an endless belt arranged around said wheels, a swiveled truck for partly supporting said frame, a vertically-movable roller for depressing a portion of said belt against the ground, means connecting the said roller and the said swiveled truck, whereby the turning of the truck in one direction actuates the said means to raise the said roller, substantially as set forth.

7. The combination of a street-cleaning machine and a receptacle for receiving the sweepings from the machine, said receptacle being supported on wheels, and having an opening formed in its lower part, and a door adapted to open and close said opening, a catch device connected with said door to actuate, and to lock the same in closed position, the said catch device consisting of a lever connected with said door, and being connected pivotally with a pivoted link or arm attached to the said receptacle and adapted to move to either side of the line of tension that the said lever exerts upon said door when the said lever is moved to lock position, the said link locking the said lever when the latter passes the said line of tension, substantially as set forth.

In testimony that I claim the foregoing I have hereunto set my hand this 28th day of November, 1894.

ANDREW H. SMITH.

Witnesses:
L. N. LEGENDEL,
R. L. SPEHNER.